(12) United States Patent
Groves, II et al.

(10) Patent No.: US 10,648,362 B2
(45) Date of Patent: *May 12, 2020

(54) SPLINE FOR A TURBINE ENGINE

(71) Applicant: General Electric Company, Schenectady, NY (US)

(72) Inventors: Robert Charles Groves, II, West Chester, OH (US); David Scott Stapleton, Boston, MA (US)

(73) Assignee: General Electric Company, Schenectady, NY (US)

( * ) Notice: Subject to any disclaimer, the term of this patent is extended or adjusted under 35 U.S.C. 154(b) by 728 days.

This patent is subject to a terminal disclaimer.

(21) Appl. No.: 15/441,586

(22) Filed: Feb. 24, 2017

(65) Prior Publication Data
US 2018/0355755 A1 Dec. 13, 2018

(51) Int. Cl.
*F01D 11/00* (2006.01)
*F01D 25/12* (2006.01)
*F01D 11/08* (2006.01)

(52) U.S. Cl.
CPC ............ *F01D 25/12* (2013.01); *F01D 11/003* (2013.01); *F01D 11/005* (2013.01); *F01D 11/08* (2013.01); *F05D 2220/323* (2013.01); *F05D 2240/11* (2013.01); *F05D 2240/55* (2013.01); *F05D 2250/12* (2013.01); *F05D 2250/72* (2013.01); *F05D 2260/201* (2013.01); *F05D 2270/112* (2013.01)

(58) Field of Classification Search
CPC ........ F01D 11/08; F01D 11/12; F01D 11/005; F01D 25/12; F01D 25/24; F01D 11/14; F01D 11/20; F01D 11/24; F05D 2260/201; F05D 2240/55; F05D 2240/57; F05D 2240/59; F05D 2240/11
See application file for complete search history.

(56) References Cited

U.S. PATENT DOCUMENTS

| 89,781 A | 5/1869 | Martin | |
|---|---|---|---|
| 4,679,981 A | * 7/1987 | Guibert | ................... F01D 11/08 |
| | | | 415/116 |
| 5,460,489 A | * 10/1995 | Benjamin | ................ F01D 5/22 |
| | | | 416/248 |

(Continued)

FOREIGN PATENT DOCUMENTS

| CA | 2891616 A1 | 5/2014 |
|---|---|---|
| CN | 1816682 A | 8/2006 |

(Continued)

OTHER PUBLICATIONS

Chinese Patent Office, Office Action re Chinese Patent Application No. 201810155198.9, dated Mar. 5, 2020, 6 pages, China.

*Primary Examiner* — Kenneth J Hansen
*Assistant Examiner* — Andrew J Marien
(74) *Attorney, Agent, or Firm* — McGarry Bair PC

(57) ABSTRACT

A shroud assembly for a turbine engine comprising a plurality of circumferentially arranged shroud segments having confronting end faces defining first and second radially spaced surfaces. The shroud assembly includes a forward edge spanning to an aft edge to define an axial direction and a set of confronting seal channels formed in each of the confronting end faces with a spline seal located within the confronting seal channels.

17 Claims, 12 Drawing Sheets

(56) References Cited

U.S. PATENT DOCUMENTS

| | | | |
|---|---|---|---|
| 5,513,955 A * | 5/1996 | Barcza | F01D 5/22 416/193 A |
| 5,738,490 A * | 4/1998 | Pizzi | F01D 11/005 415/139 |
| 5,762,472 A | 6/1998 | Pizzi et al. | |
| 6,059,525 A * | 5/2000 | Jiomacas | F01D 25/246 415/139 |
| 6,340,285 B1 * | 1/2002 | Gonyou | F01D 11/005 415/116 |
| 6,354,795 B1 * | 3/2002 | White | F01D 11/24 415/116 |
| 6,726,448 B2 | 4/2004 | McGrath et al. | |
| 6,742,783 B1 * | 6/2004 | Lawer | F01D 11/08 277/412 |
| 7,186,078 B2 | 3/2007 | Tanaka | |
| 7,217,081 B2 | 5/2007 | Scheurlen et al. | |
| 7,347,662 B2 | 3/2008 | Balsdon | |
| 8,100,644 B2 | 1/2012 | Hazevis et al. | |
| 8,434,999 B2 * | 5/2013 | Amaral | F01D 11/005 415/173.3 |
| 8,684,680 B2 | 4/2014 | Martin et al. | |
| 8,753,073 B2 * | 6/2014 | Albers | F01D 5/225 |
| 8,784,041 B2 | 7/2014 | Durocher et al. | |
| 8,784,044 B2 | 7/2014 | Durocher et al. | |
| 8,961,117 B2 | 2/2015 | Garin et al. | |
| 8,998,573 B2 * | 4/2015 | Albers | F01D 11/005 415/173.3 |
| 9,238,977 B2 * | 1/2016 | Albers | F01D 5/225 |
| 9,863,264 B2 * | 1/2018 | Kulkami | F01D 9/04 |
| 2004/0141838 A1 * | 7/2004 | Thompson | F01D 11/08 415/209.3 |
| 2005/0053462 A1 | 3/2005 | Burdgick | |
| 2005/0249588 A1 | 11/2005 | Ferra et al. | |
| 2006/0182624 A1 * | 8/2006 | London | F01D 5/225 415/170.1 |
| 2009/0074579 A1 * | 3/2009 | Hervy | F01D 11/005 416/179 |
| 2009/0169368 A1 * | 7/2009 | Schlichting | F01D 11/122 415/173.1 |
| 2010/0247298 A1 * | 9/2010 | Nakamura | F01D 11/18 415/173.1 |
| 2014/0348642 A1 | 11/2014 | Weber et al. | |
| 2014/0363279 A1 | 12/2014 | Wondrasek et al. | |
| 2018/0038238 A1 * | 2/2018 | Ribarov | F01D 11/20 |
| 2018/0340437 A1 * | 11/2018 | Groves, II | F01D 11/005 |

FOREIGN PATENT DOCUMENTS

| | | |
|---|---|---|
| CN | 105189934 A | 12/2015 |
| EP | 1965031 A2 | 9/2008 |
| GB | 2481481 A | 12/2011 |
| JP | 11-343809 | 12/1999 |

* cited by examiner

SPLINE FOR A TURBINE ENGINE

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine blades. In the compressor stages, the blades are supported by posts protruding from the rotor while the vanes are mounted to stator disks. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate at high temperatures to maximize engine thrust, so cooling of certain engine components is necessary during operation. Reducing cooling air leakage between adjacent flow path segments in gas turbine engines is desirable to maximize efficiency and lower specific fuel consumption. In adjacent compressor and turbine stages, axial and radial segment gaps create flow paths allowing leakage. Spline seals are used to decrease the leakage in these areas.

BRIEF DESCRIPTION OF THE INVENTION

In one aspect, the present disclosure relates to a shroud assembly for a turbine engine comprising a plurality of circumferentially arranged shroud segments having confronting end faces defining first and second radially spaced surfaces, with a forward edge spanning to an aft edge to define an axial direction, a first seal channel provided in at least one of the end faces, a second seal channel provided in the at least one of the end faces and radially spaced from the first seal channel such that the first seal channel is radially closer to the first surface and the second seal channel is radially closer to the second surface, and at least one gap formed in the first seal channel to provide for the passing of fluid through the gap toward the second seal channel.

In another aspect, the present disclosure relates to an engine component for a turbine engine comprising a plurality of circumferentially arranged peripheral walls defining a mainstream flow path and having confronting end faces defining first and second radially spaced surfaces, with a leading edge spanning to an aft edge to define an axial direction, a first seal channel provided in at least one of the end faces, a second seal channel provided in the at least one of the end faces and radially spaced from the first seal channel such that the first seal channel is radially closer to the first surface and the second seal channel is radially closer to the second surface, and at least one gap formed in the first seal channel to provide for the passing of fluid through the first seal channel to the second seal channel.

In another aspect, the present disclosure relates to a method of cooling a shroud segment having confronting end faces and a first and second set of seal channels provided in each of the confronting end faces where at least one gap is formed in the first seal channel; the method comprising passing fluid through the first seal channel to the second seal channel.

DESCRIPTION OF EMBODIMENTS OF THE INVENTION

The described embodiments of the present invention are directed to systems, methods, and other devices related to routing air flow in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
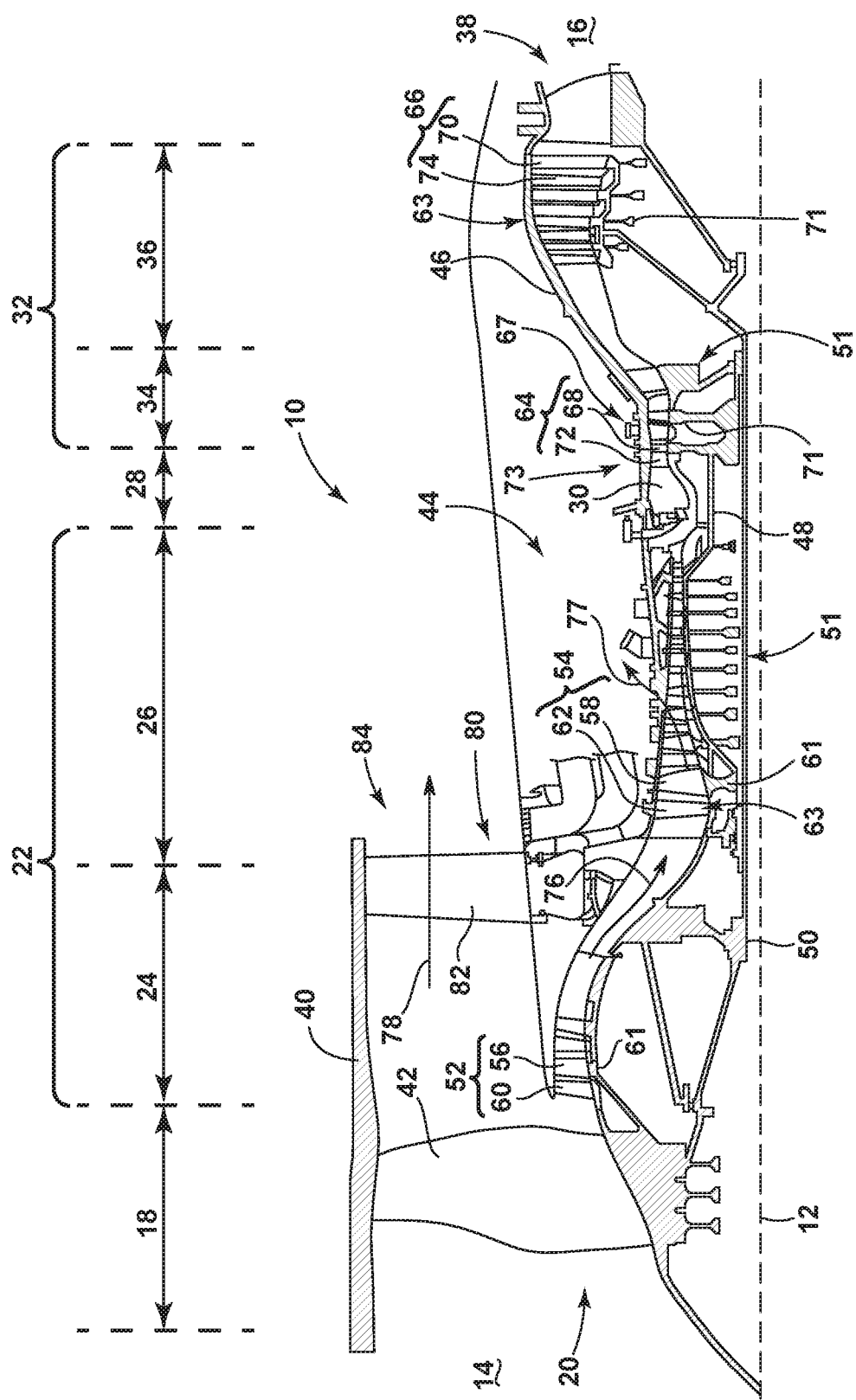
FIG. 1 is a schematic, sectional view of a gas turbine engine according to aspects of the disclosure described herein.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66. A blade assembly 67 includes a set of turbine blades 68, 70. The set of turbine blades 68, 70 are rotated relative to a corresponding nozzle assembly 73 which includes a set of turbine vanes 72, 74. The set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
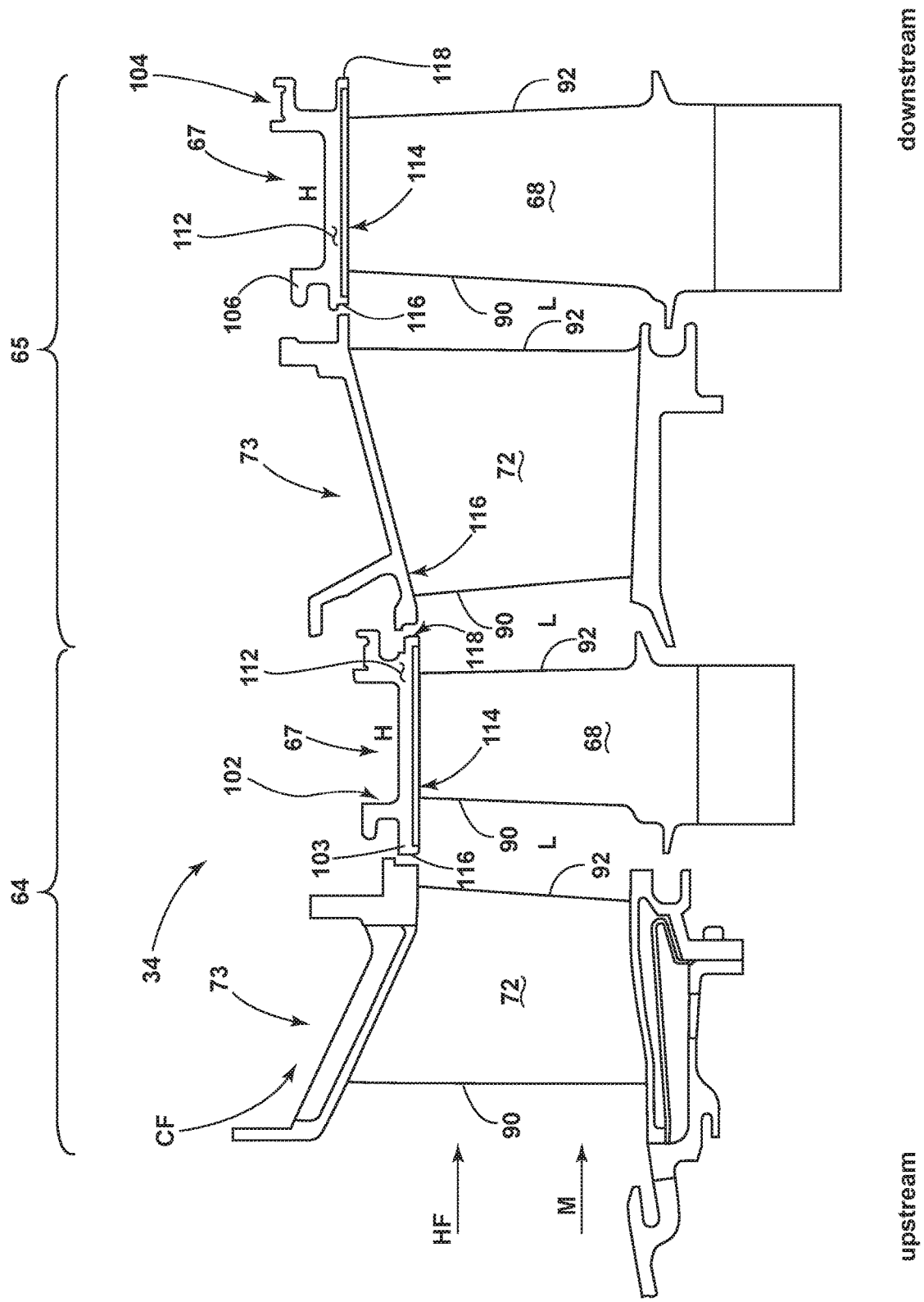
FIG. 2 is a schematic, sectional view of a blade assembly and a nozzle assembly according to aspects of the disclosure described herein.

FIG. 2, illustrates the blade assembly 67 and the nozzle assembly 73 of the HP turbine 34. The blade assembly 67 includes the set of turbine blades 68. Each of the blades 68 and vanes 74 have a leading edge 90 and a trailing edge 92. The blade assembly 67 is encircled by an engine component, a peripheral assembly 102 with a plurality of circumferentially arranged peripheral walls 103 around the blades 68. The peripheral assembly 102 defines a mainstream flow M and can circumferentially encompass blades, vanes, or other airfoils circumferentially arranged within the engine 10.

In the illustrated example, the peripheral assembly 102 is a shroud assembly 104 with a shroud segment 106 having opposing and confronting end faces 112. A spline seal 114 extends along the confronting end faces 112 of the shroud segment 106. Each shroud segment 106 extends axially from a forward edge 116 to an aft edge 118 and at least partially separates an area of relatively high pressure H from an area of relative low pressure L. The shroud segment 106 at least partially separates a cooling air flow (CF) from a hot air flow (HF) in the turbine engine 10.

Figure 3:
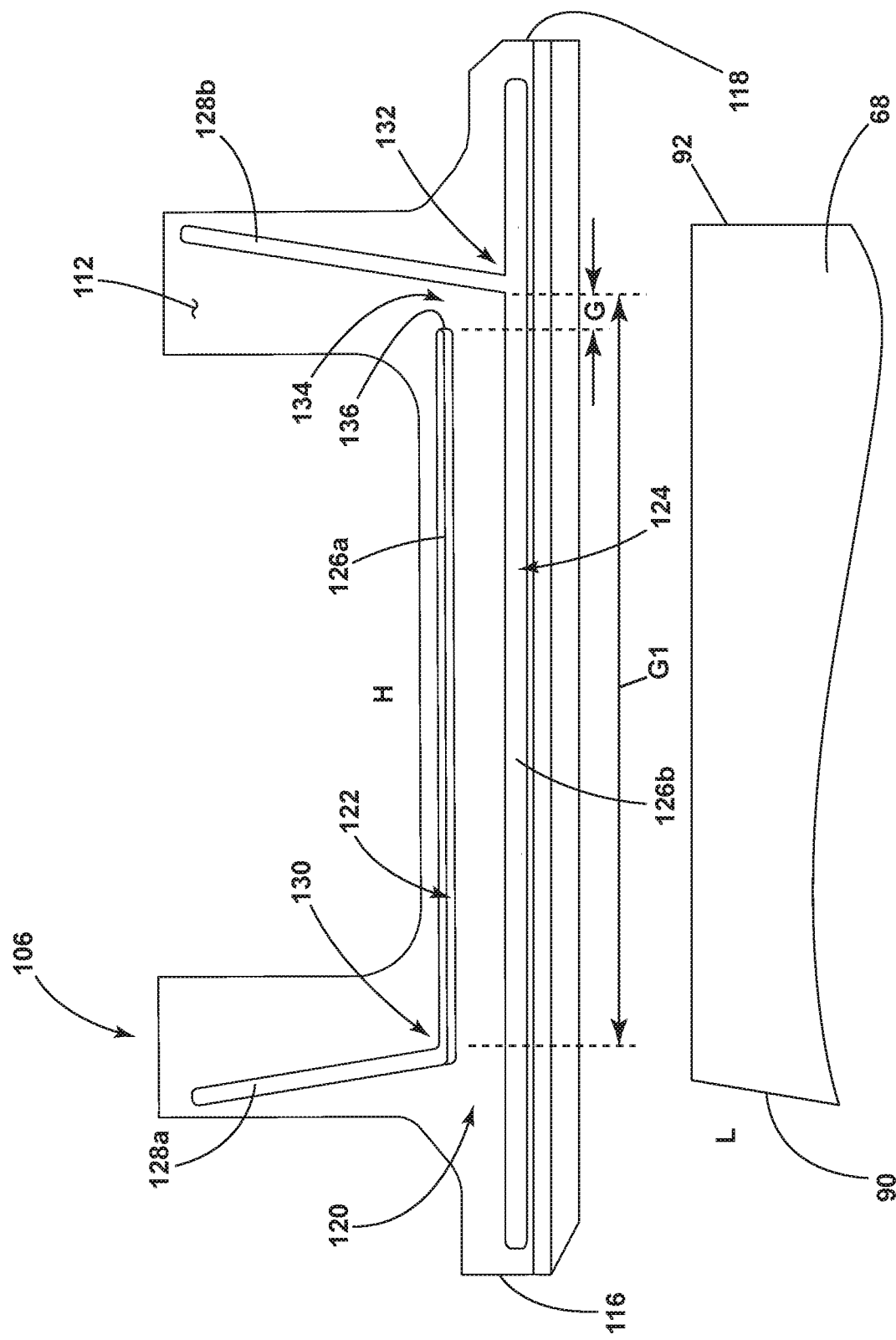
FIG. 3 is a side view of a first exemplary shroud assembly and a portion of a blade from FIG. 2 according to aspects of the disclosure described herein.

FIG. 3 is an enlarged view of a first exemplary confronting end face 112 of the shroud segment 106. While only one confronting end face 112 is illustrated, it should be understood that the other of the confronting end faces, while not necessary for the invention, will typically be a mirror image of the illustrated confronting end face 112. A set of confronting seal channels 120 is formed in each of the confronting end faces 112. The set of confronting seal channels 120 can include a first and second seal channel 122, 124. The first seal channel 122 can transition from an axial portion 126a to a radial portion 128a at a transition point 130 proximate the forward edge 116 of the shroud segment 106. The second seal channel can transition from an axial portion 126b to a radial portion 128b at a second transition point 132 proximate the aft edge 118 of the shroud segment 106. The radial portions 128a, 128b and the axial portions 126a, 126b can be part of one, both, or none of the set of confronting seal channels 120.

Optionally, a gap 134 can be provided within at least one of the first or second seal channel 122, 124. The gap 134 can be located along, but not limited to, a trailing end 136 of the first seal channel 122. The gap 134 location is dependent on the position of the shroud segment 106 relative to the turbine engine 10, and can therefore be located at any position and in either the first or second seal channels 122, 124. It is also contemplated that the gap 134 can be multiple gaps provided at multiple locations within the first or second seal channels 122, 124.

The gap 134 can define a gap distance (G) ranging in size depending on the geometry of the confronting end face 112. The gap distance (G) can be as large as a first distance (G1) measured between the transition point 130 and the second transition point 132. At a minimum, the gap distance is at least 0.01 in (0.03 cm).

Figure 4:
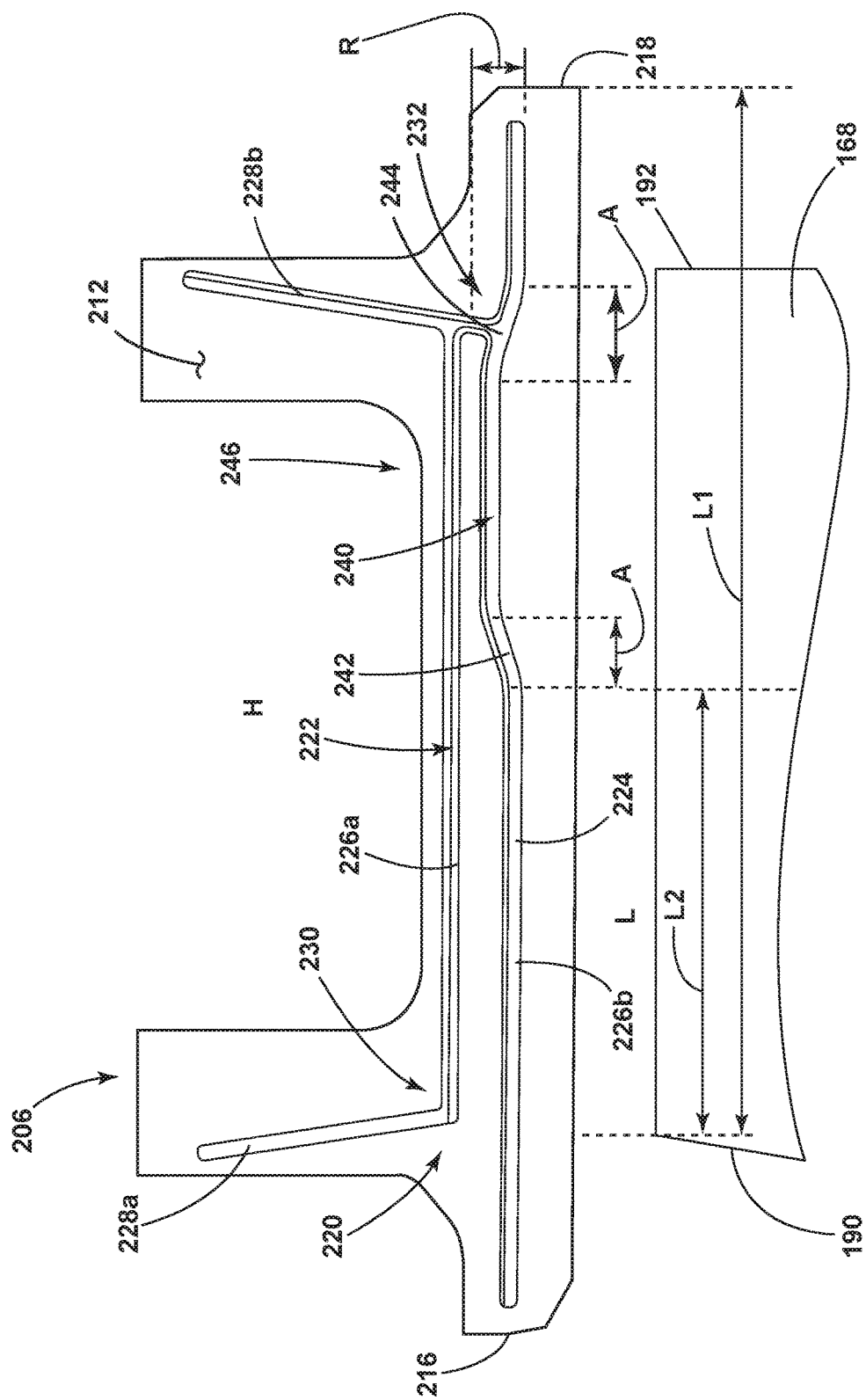
FIG. 4 is a side view of a second exemplary shroud assembly and a portion of a blade from FIG. 2 according to aspects of the disclosure described herein.

FIG. 4 illustrates another shroud segment 206 with exemplary confronting end faces 212 and alternative configurations of sets of confronting seal channels 220. The other exemplary confronting end face 212 is similar in function to the first exemplary confronting end face 112 illustrated in FIG. 3, therefore like parts will be identified with like numerals increased by 100. It should be understood that the description of the like parts of the exemplary confronting end face 112 applies to the other exemplary confronting end face 212 unless otherwise noted.

A second exemplary shroud segment 206 with a confronting end face 212 includes a crown 240 in a second channel 224 created by a fore bend 242 and an aft bend 244. Each bend 242, 244 is defined by an axial length (A) and a radial length (R). The ratio of the axial length (A) to the radial length (R) can range between 0.1 and 10. A higher ratio corresponds with a minimal controlled leakage at the bend 242, 244 while a lower ratio corresponds with a maximized controlled leakage at the bend 242, 244. The fore bend 242 can incline radially outward and the aft bend 244 can incline radially inward to define the crown 240. The aft bend 244 can be coupled to the second seal channel 224 proximate transition point 232. The crown 240 can be located at least in part in an axial downstream portion 246 of the confronting end face 212.

The shroud segment 206 is located radially outward of a blade 168 having a leading edge 190 and a trailing edge 192. A first length L1 can be measured axially from the aft edge 218 of the shroud segment 206 to the leading edge 190 of the blade 168. A second length L2 can be measured axially from the leading edge 190 of the blade 168 to the fore-most of the bends, the fore bend 242 such that the second length L2 is less than the first length L1. L2 can equal zero, but never be less than zero such that fore bend 242 is no farther forward than the leading edge 190 of the blade 168. The distance L2 is sized to position fore bend 242 such that controlled leakage at bend 242 is in a beneficial location for cooling.

Figure 5:
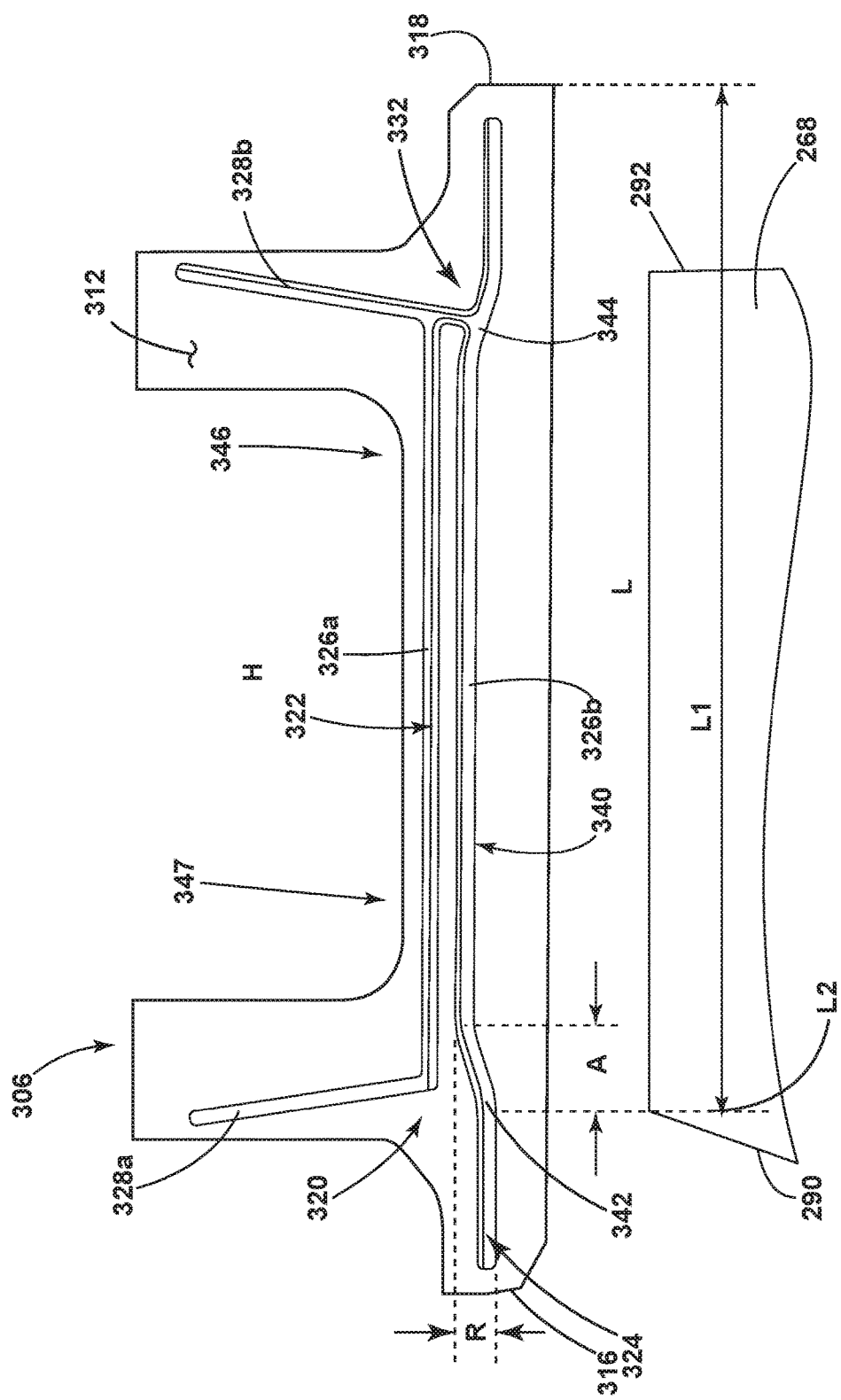
FIG. 5 is a side view of a third exemplary shroud assembly and a portion of a blade from FIG. 2 according to aspects of the disclosure described herein.
Figure 6:
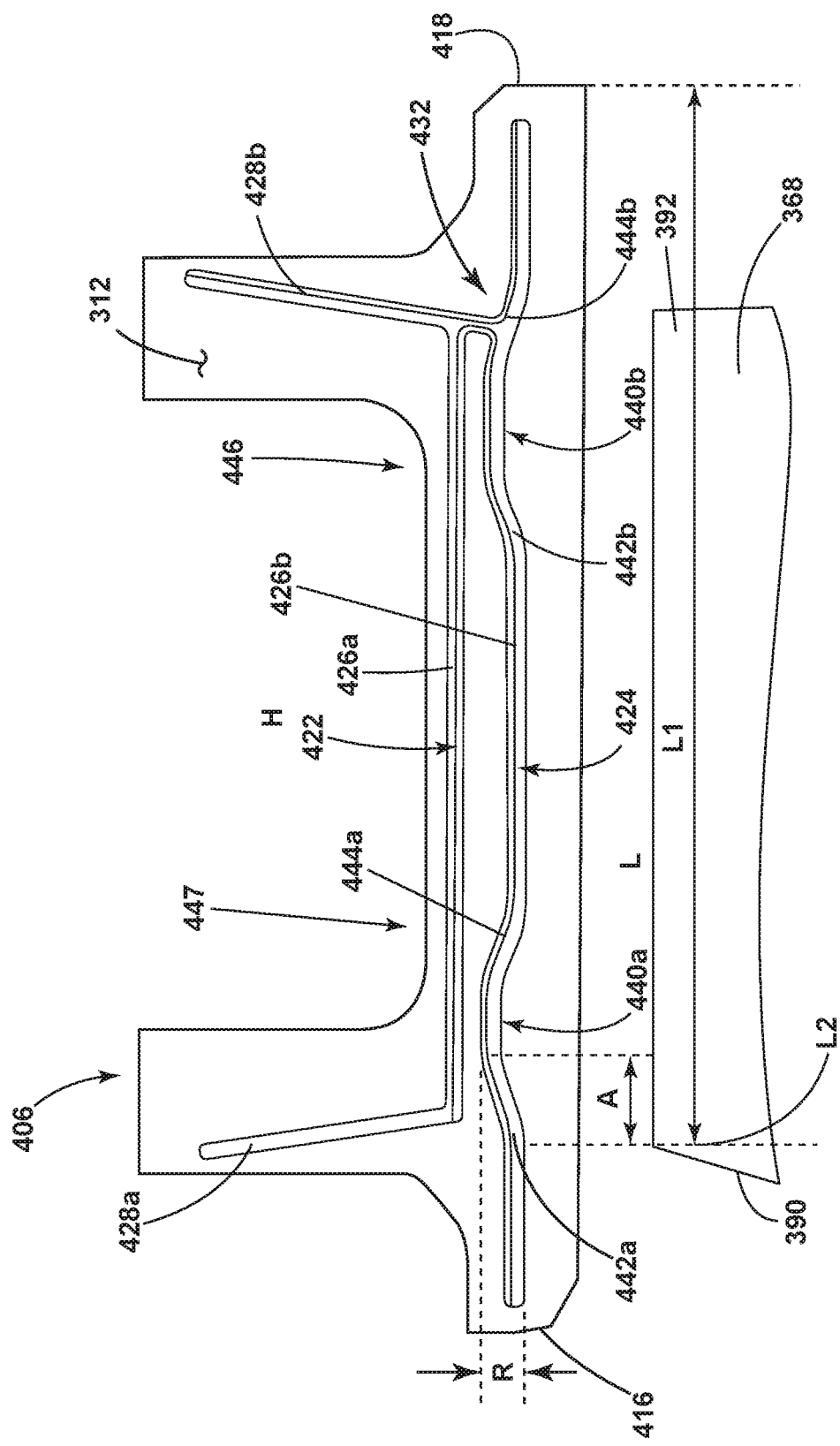
FIG. 6 is a side view of a fourth exemplary shroud assembly and a portion of a blade from FIG. 2 according to aspects of the disclosure described herein.
Figure 7:
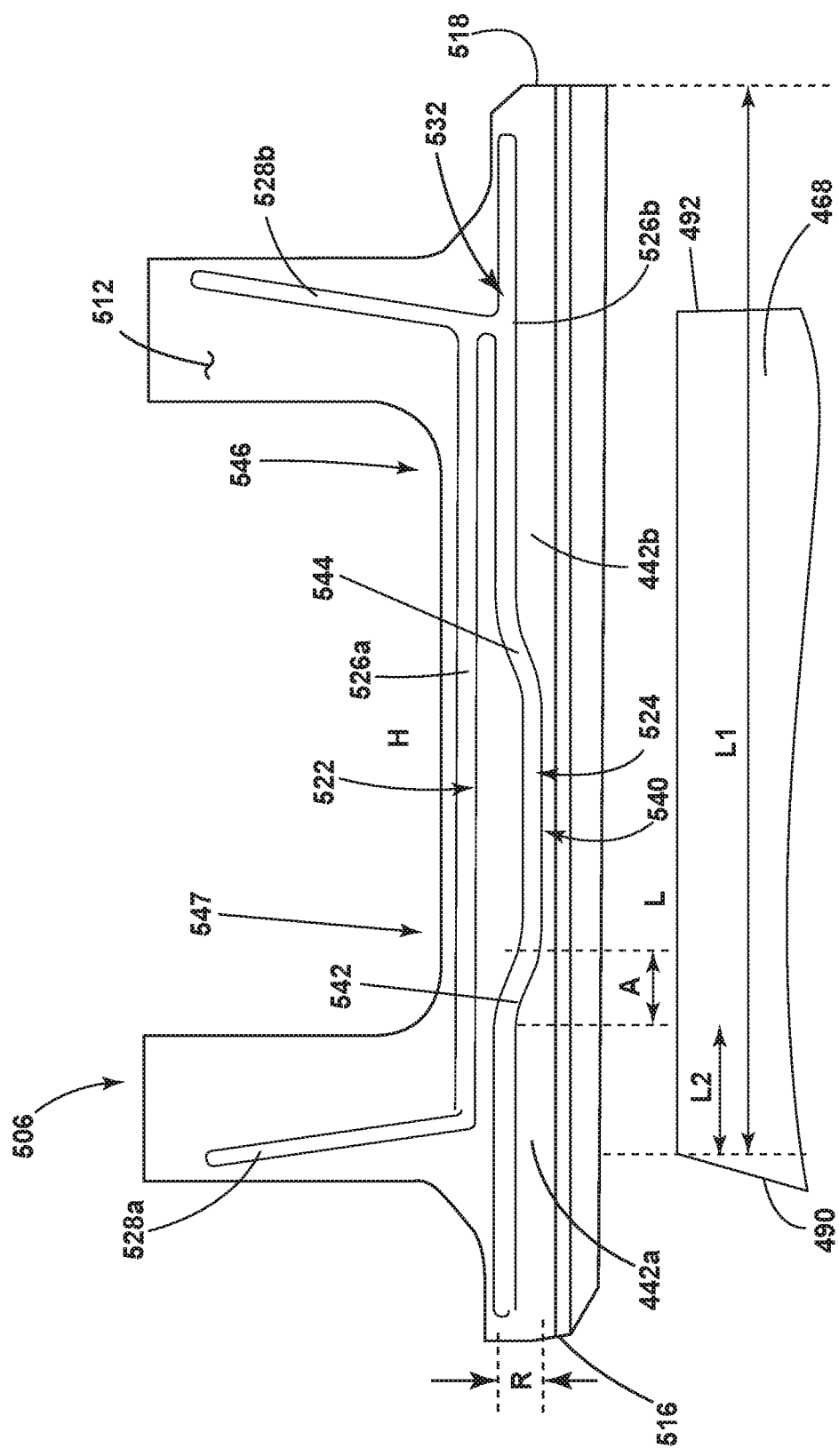
FIG. 7 is a side view of a fifth exemplary shroud assembly and a portion of a blade from FIG. 2 according to aspects of the disclosure described herein.

FIGS. 5, 6, and 7 illustrates other shroud segments 306, 406, 506 with exemplary confronting end faces 312, 412, 512 and alternative configurations of sets of confronting seal channels 320, 420, 520. The other exemplary confronting end faces 312, 412, 512 are similar in function to the second exemplary confronting end face 212 illustrated in FIG. 4, therefore like parts will be identified with like numerals increased by 100, 200, and 300 respectively. It should be understood that the description of the like parts of the exemplary confronting end face 212 applies to the other exemplary confronting end faces 312, 412, 512 unless otherwise noted.

Turning to FIG. 5, a third exemplary shroud segment 306 is similar to the second exemplary shroud segment 206. The third exemplary shroud segment 306 includes a confronting end face 312 having a crown 340 in a second channel 324 with a fore bend 342 proximate a forward edge 316 of the shroud segment 306 and an aft end 344 proximate the aft edge 318 of the shroud segment 306. The third exemplary crown 340 is axially longer than the second exemplary crown 240. In the illustrated example the second length L2 is zero. It is contemplated that the second length L2 can be greater than zero and less than the first length L1, such that the crown 340 is located at least in part in an axial upstream portion 347 of the confronting end face 312.

Turning to FIG. 6, a fourth exemplary shroud segment 406 depicts multiple crowns 440a and 440b. Each crown 440a, 440b includes a fore bend 442a, 442b inclining radially outward and an aft bend 444a, 444b inclining radially inward. A first crown 440a is located in an axial upstream portion 447 of the confronting end face 412 and a second crown 440b is located in an axial downstream portion 446 of the confronting end face 412.

In FIG. 7, a fifth exemplary shroud segment 506 includes an inverted crown 540, where a fore bend 542 inclines radially inward and an aft bend 544 inclines radially outward. In the fifth exemplary crown 540, the second length L2 can range in length such that the crown 540 is located at least in part in an axial upstream portion 547 or downstream portion 546 of the confronting end face 512.

While the gap 134 depicted in the first exemplary shroud segment 106 is not illustrated in the second, third, fourth, and fifth exemplary shroud segments, it should be understood that each configuration of the illustrated first and second channels can include a gap as described herein. The placement and size of the gap 134 are dependent on the location of the shroud segment with respect to the turbine engine 10. The gap 134 can provide post-impingement air directly along the confronting end face 112 between the first and second seal channels 122, 124 for cooling.

It is further contemplated that any combination of the crowns as described herein can be applied to the set of confronting seal channels illustrated in each of the second, third, fourth, and fifth exemplary shroud segments.

Figure 8:
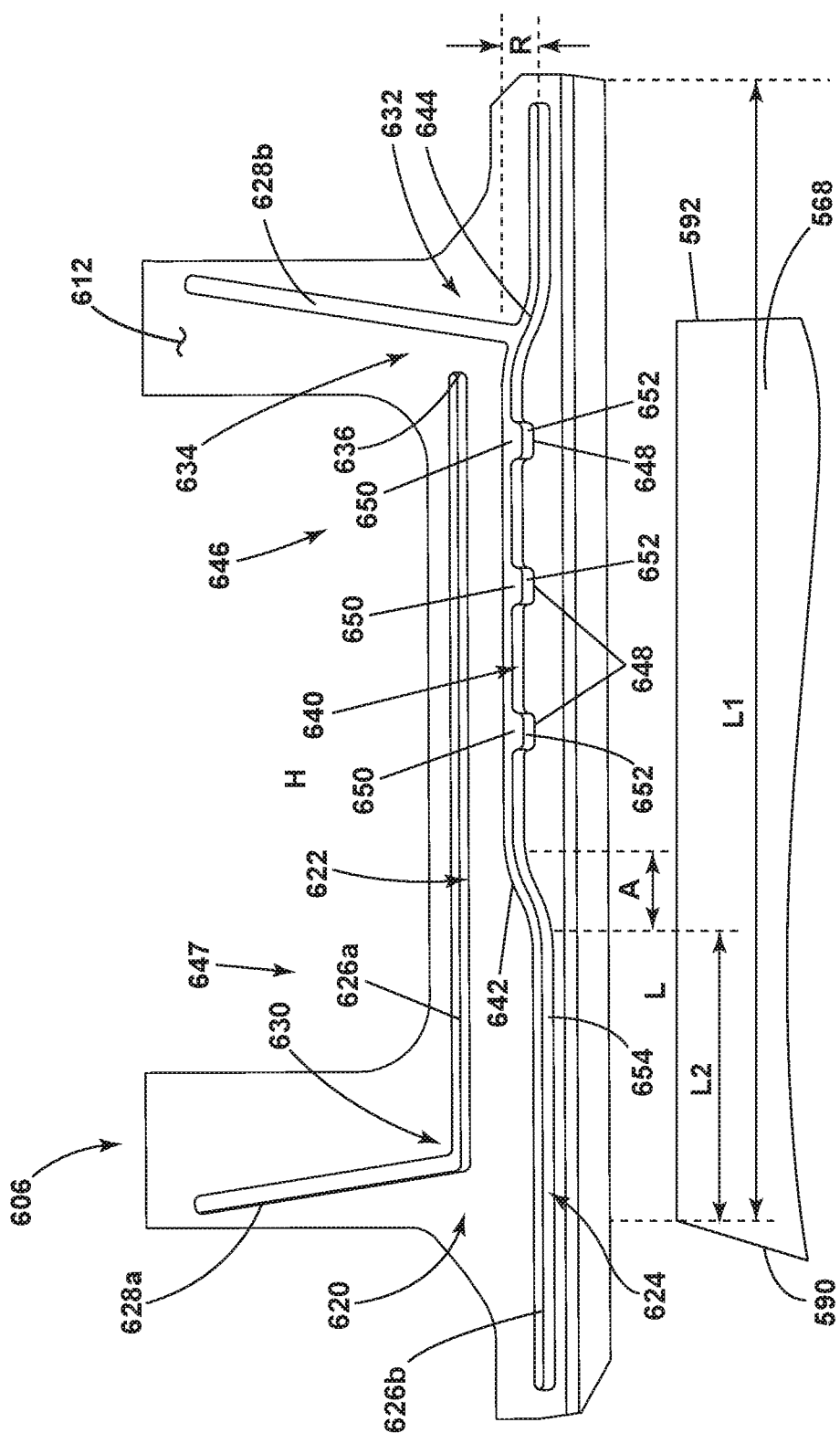
FIG. 8 is a side view of a sixth exemplary shroud assembly and a portion of a blade from FIG. 2 according to aspects of the disclosure described herein.

FIG. 8 illustrates another shroud segment 606 with exemplary confronting end face 612 and alternative configurations of sets of confronting seal channels 620. The other exemplary confronting end face 612 is similar in function to the first exemplary confronting end face 212 illustrated in FIG. 4, therefore like parts will be identified with like numerals increased by 400. It should be understood that the description of the like parts of the exemplary confronting end face 212 applies to the other exemplary confronting end face 612 unless otherwise noted.

Turning to FIG. 8, a sixth exemplary shroud segment 606 includes a set of confronting seal channels 620 formed in the confronting end face 612. The set of confronting seal channels 620 includes a first and second seal channel 622, 624. The second confronting seal channel 624 includes a crown 640 in which at least one slot 648 is provided. The crown 640 can include multiple slots 648 as illustrated. Each slot 648 has an open top 650 and defines a channel 652 in a radially inner side 654 of the second seal channel 624. A gap 634 can be provided at a trailing end 636 of the first seal channel 622, or at any other appropriate location in the first or second seal channel 622, 624 as previously discussed herein.

Figure 9:
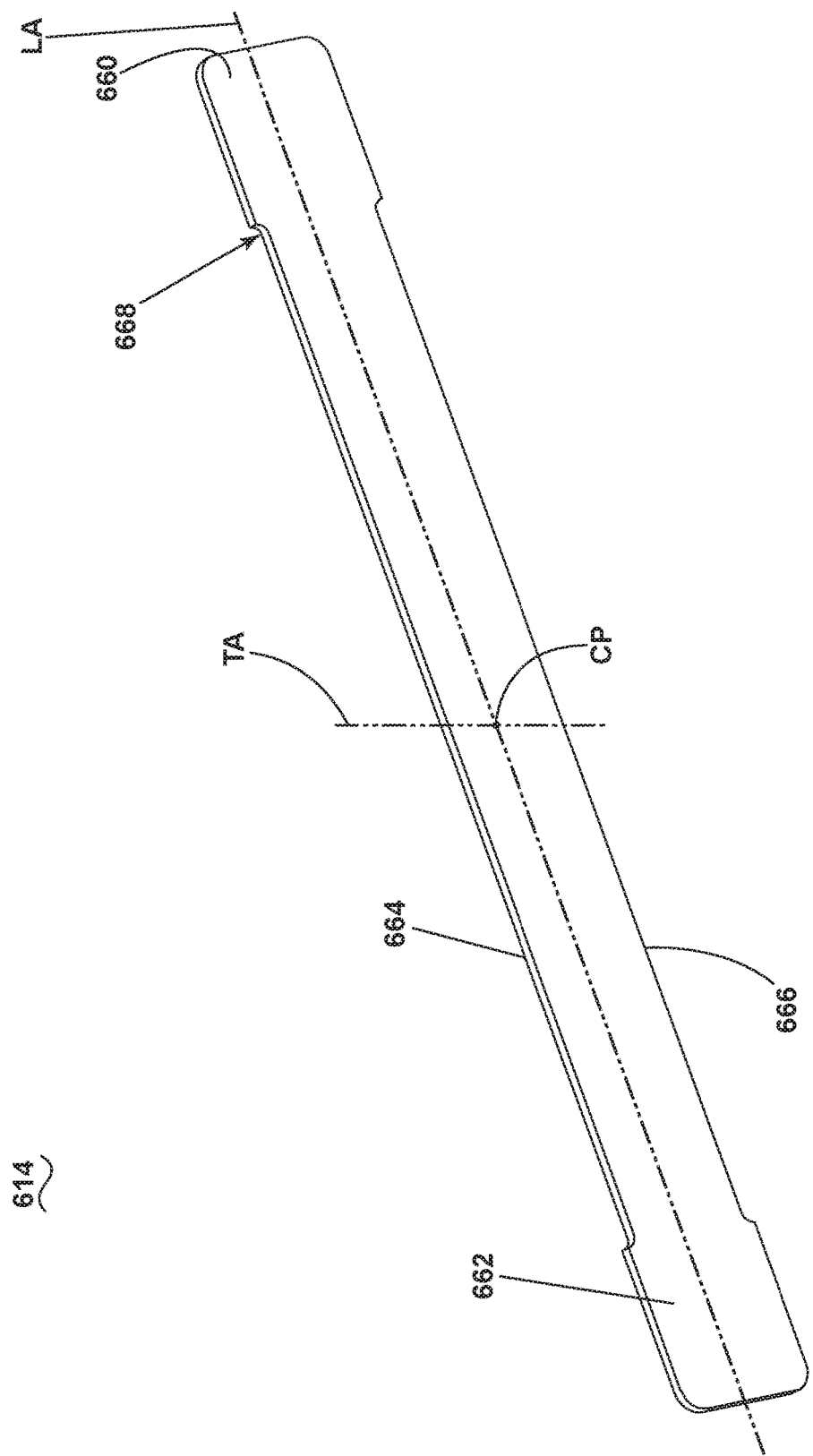
FIG. 9 is a perspective view of a spline seal according to aspects of the disclosure described herein.

Turning to FIG. 9, in an exemplary embodiment, the spline seal 114 of FIG. 2 can be a spline seal 614 with a dog-bone shape. The spline seal 614 can be generally rectangular with terminal ends 660, 662 connected by opposing sides 664, 666 with a relief portion 668 formed in at least one of the sides 664, 666. In the exemplary spline seal 614, the relief portion 668 is formed in both sides 664, 666 to define the dog-bone shape. The terminal ends 660, 662 can be of any length and have a width such that when assembled, the spline seal 614 has minimal shifting. The width at the terminal ends 660, 662 is greater than a width at the relief portion 668. The spline seal 614 can include a center point (CP) through which passes both a longitudinal axis (LA) and a transverse axis (TA), wherein the spline seal 614 is symmetrical with respect to at least one of the longitudinal axis (LA) and the transverse axis (TA). The relief portion 668 has a length that corresponds to the placement and location of the slots 648. The relief portion 668 along with the slots 648 can be sized and placed to provide a specific amount of cooling to the end face 612, spline seal 614 or shroud segment 606.

Figure 10:
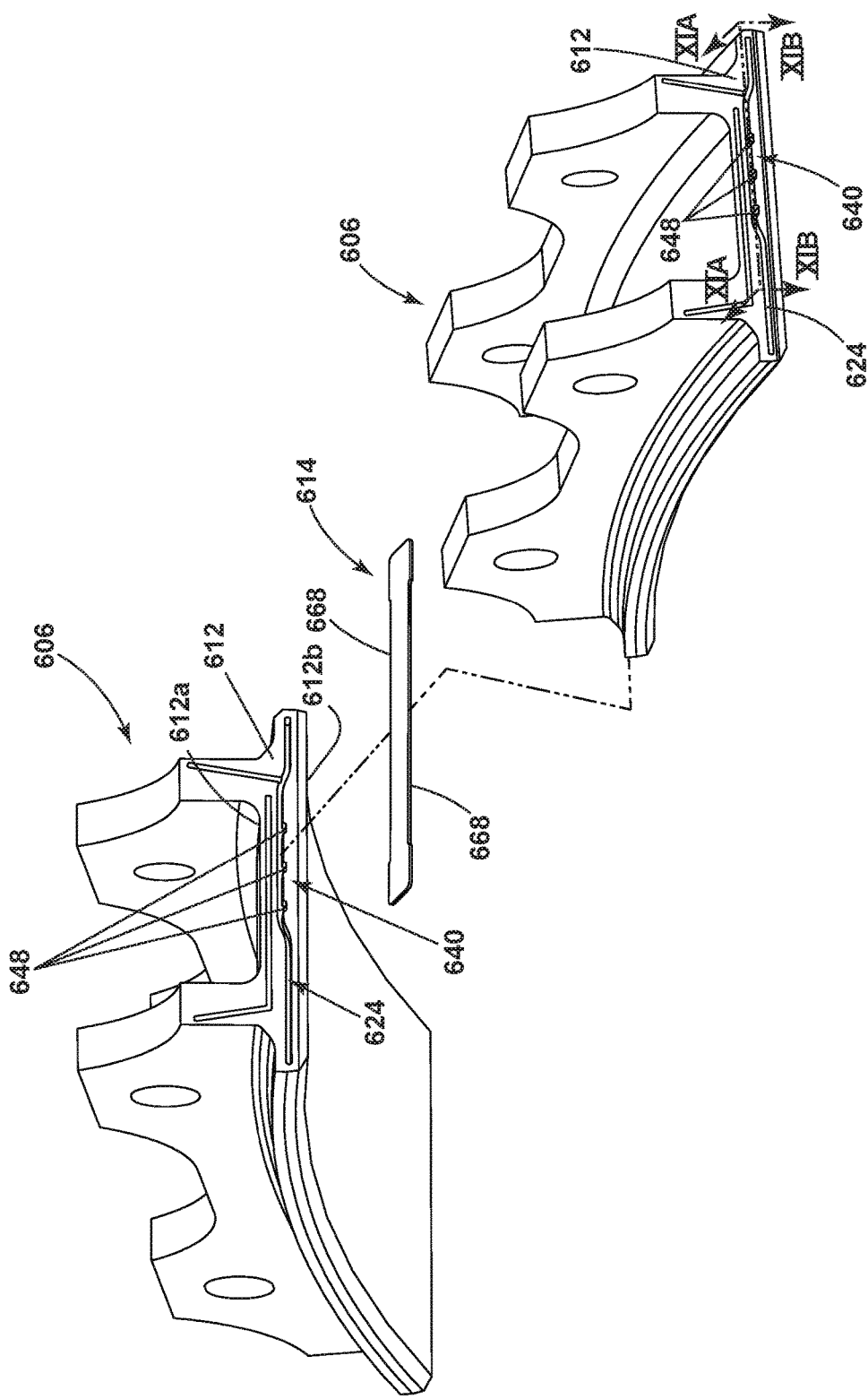
FIG. 10 is a perspective view of the shroud assembly of FIG. 8 and the spline seal of FIG. 9 in an exploded view.

Turning to FIG. 10, when assembled, shroud segments 606 are circumferentially arranged with at least one spline seal 614 provided in the second seal channel 624 such that the relief portion 668 is adjacent the slots 648. The spline seal 614 can be bendable and shaped to fit into the crown 640 of the second seal channel 624. The spline seal 614 extends between the corresponding confronting seal channels 624. While only one spline seal 614 is illustrated, it should be appreciated that other spline seals can be provided in the first seal channel 622 including the axial and radial portions 626a, 628a and in any remaining portions of the second seal channel 624, including but not limited to the axial portion 628b. The opposing and confronting end faces 612 define first and second radially spaced surfaces 612a, 612b.

Figure 11A:
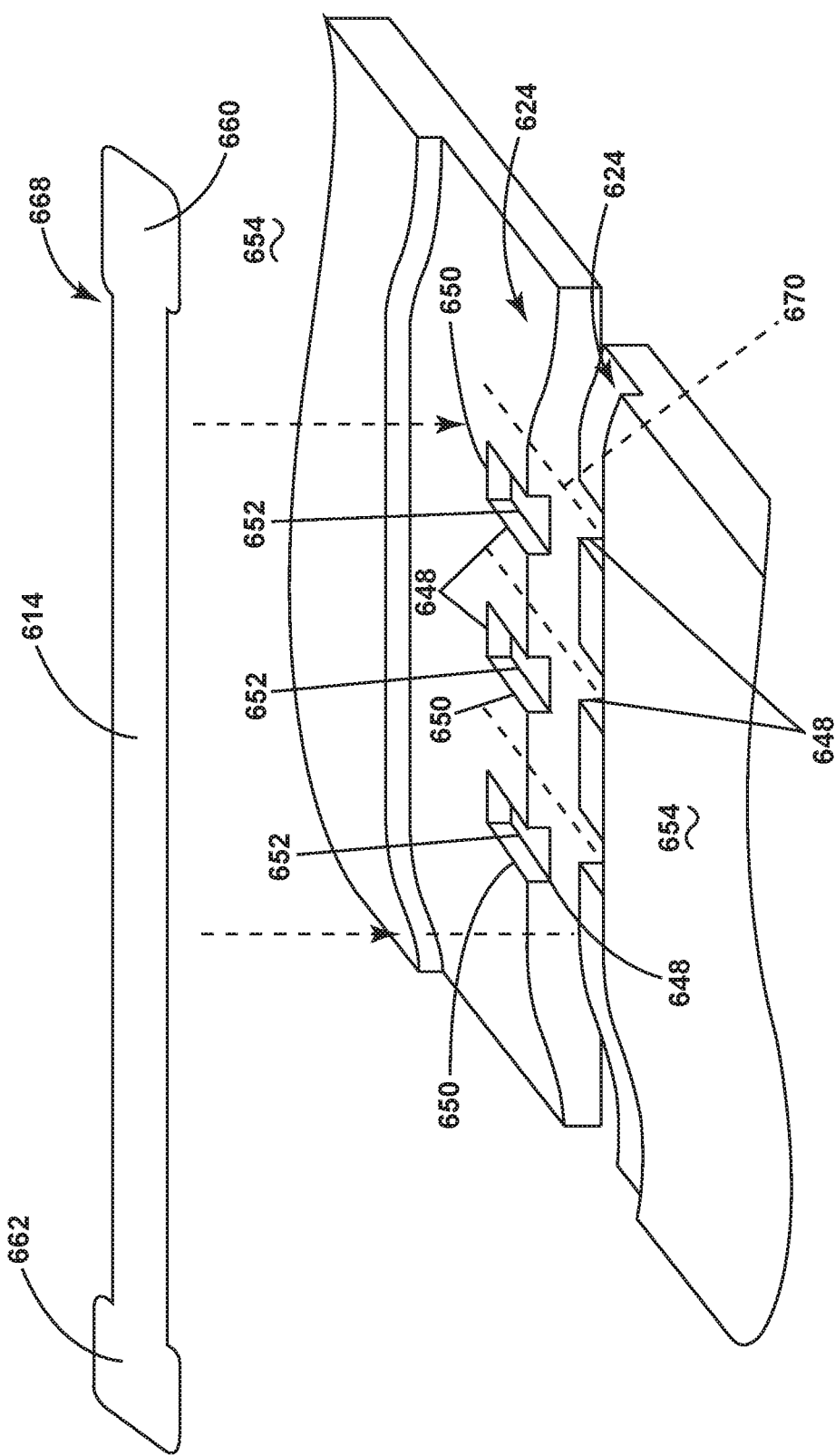
FIG. 11a is a perspective view of a portion of the shroud assembly of FIG. 8 according to aspects of the disclosure described herein.

FIG. 11A is a perspective view taken along line XIA of the radially inner side 654 of the second seal channel 624. The channels 652 of the slots 648 in the second seal channel 624 extend partially into the second seal channel 624. It is also contemplated that the channels 652 can extend fully into the confronting set of seal channels 620 including beyond the depth of the confronting seal channels 620 and is not limited to a partial extension. The slots 648 are provided in opposite ones of the set of confronting seal channels 620 and are axially spaced from each other. Additionally, the slots can be alternated in that corresponding slots 648 in the set of confronting seal channels 620 do not face each other as depicted by the dashed lines 670. It is also contemplated that the slots are directly across from each other. The spline seal 614 is placed so that the relief portion 668 is above the open tops 650 of the channels 652.

Figure 11B:
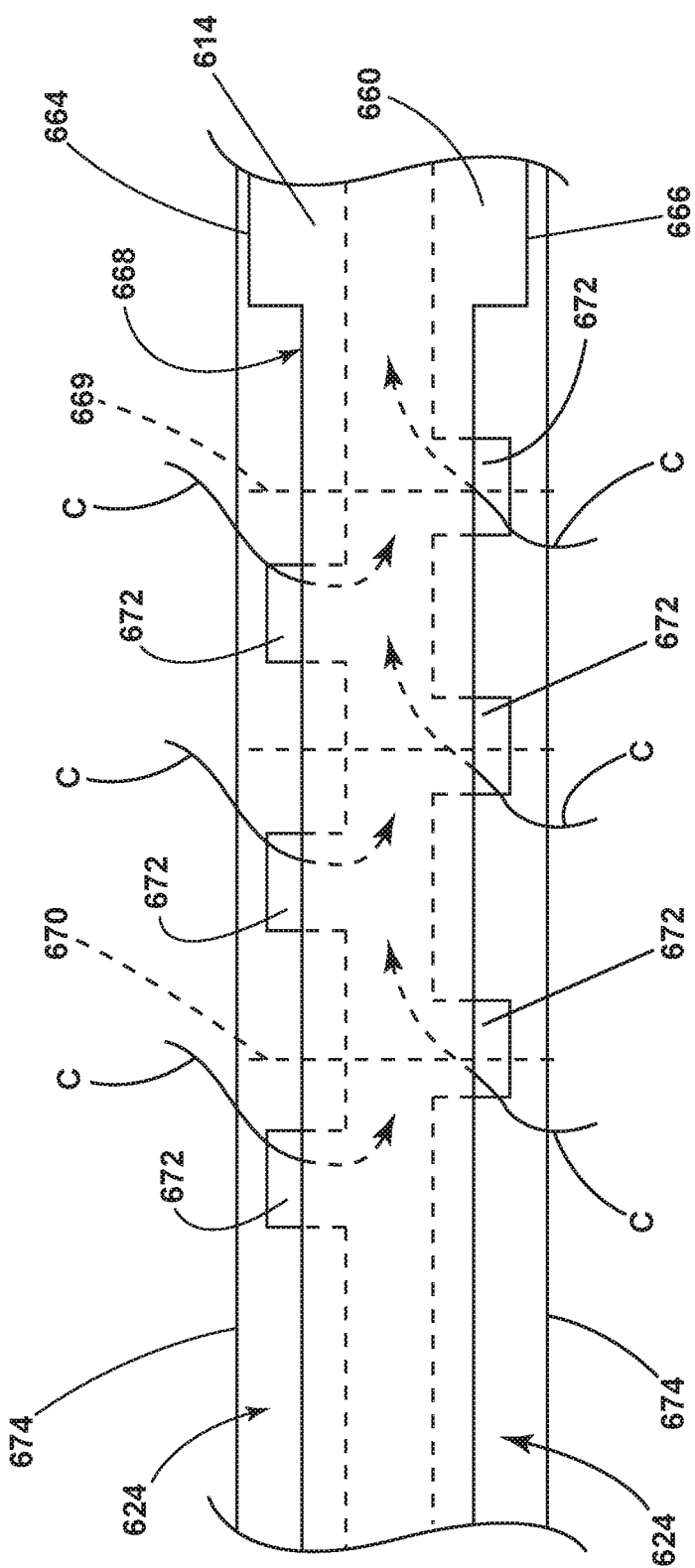
FIG. 11b is a top view of the portion of the shroud assembly of FIG. 11b according to aspects of the disclosure described herein.

A top view of FIG. 11A is illustrated in FIG. 11B. The relief portion 668 of the spline seal 614 overlies at least a portion of the open top 650 creating an opening 672 in the second seal channel 624. The relief portion 668 can be adjusted according to the extent to which the channels 652 extend into the confronting seal channels 620 to create the opening 672. Cooling air (C) can flow through the opening 672 into the slot 648 passing through the channels 652 and onto the confronting end face 612. At the terminal end 660 of the spline seal 614, the opposing sides 664, 666 abut an opposing inner edge 674 of the opposing second seal channels 624. The spline seal 614 is therefore held in place by the opposing inner edges 674 of the opposing second spline seals 624 while maintaining the openings 672 created by the relief portion 668.

A method of cooling the adjacent shroud segments 606 can include flowing the cooling air (C) through the opening 672 formed by the relief portion 668 into the slot 648 or multiple slots 648 axially spaced along the confronting seal channels 624. The method can also include flowing the cooling air (C) into multiple slots axially offset and axially spaced along the confronting seal channels 624. Furthermore, the method can include flowing cooling air (C) into impingement with the confronting faces 612. The cooling air (C) flows from the area of relatively higher pressure H to the area of relatively lower pressure L.

Another method of cooling the shroud segment 606 can include controlling the amount of cooling air (C) flowing between confronting bends 642, 644. Controlling the amount of cooling air (C) can include maximizing the amount of cooling air flowing between confronting bends 642, 644 by forming the bends 642, 644 with the radial length (R) larger than the axial length (A). A larger radial length (R) corresponds to a steeper bend in the spline seal 614 such that the spline seal 614 will not conform exactly to the bend when assembled which can contribute to allowing a controlled leak of the cooling air (C). Likewise, controlling the cooling air (C) can also include minimizing the amount of cooling air (C) flowing between confronting bends 642, 644 by making the axial length (A) larger than the radial length (R).

Controlling the amount of cooling air (C) can further include controlling vibrations in the set of seal channels 620 by locating bends 642, 644 according to the pressure variation between the area of relatively high pressure (H) and the area of relatively low pressure (L). The bends 642, 644 can therefore be optimized for the specific implementation and location of each shroud segment 606.

An additional method of cooling the spline seal 614 separating the cooling air flow (CF) from the hot air flow (HF), can include flowing the cooling air (C) in the slot 648 or multiple slots 648 in ways already described herein.

Yet another method of cooling the shroud segment 606 can include passing fluid or cooling air (C), as described herein, through the first seal channel 622 to the second seal channel 624 by supplying cooling air (C) through the gap 634 to the opening 672. The method can further include balancing a pressure load between the area of relatively high pressure (H) and the area of relatively low pressure (L).

It should be understood that while the methods described herein are described using numerals associated with the sixth exemplary shroud segment 606, the methods can be implemented in whole or in part or in any combination in all of the exemplary shroud assemblies described herein. The methods are therefore not limited to any one arrangement of the shroud segments as described herein.

Benefits to the sealing arrangement of the set of seal channels 620 described herein include optimizing cooling performance by targeting cooling air flow towards specific locations to minimize a required amount of coolant in those areas. Each component of the sealing arrangement, set of seal channels 620, the gap 634, the crown 640, and the at least one slot 648 described herein, can each be optimized to enhance the benefits of the other components however, it is also contemplated that each piece can be implemented individually. The individual components along with the sealing arrangement as a whole can improve the component life by reduced temperatures during operation along with protecting the spline seal from burn-through by reducing operating temperatures.

The spline seal 614 is designed to discourage slipping to one side of the set of seal channels 620 so that the openings 672 remain during operation. The dog-bone shape prevents a reduction in flow by ensuring a leakage path will always be present regardless of the spline seal 614 position within the set of seal channels 620.

The bends 642, 644 prevents break down of the spline seal 614 due to vibration or over-temperature. The bends 642, 644 can be placed, spaced, and sized to optimize leakage and vibration control. Elongating the life of the spline seal 614 leads to an increased overall high pressure turbine efficiency and aircraft time on wing.

The slots 648 reduce local material temperatures and minimize additional leakage. The slots 648 contribute to increasing the life of the spline seal 614 and protect the spline seal 614 from burn-through.

The gap 634 contributes to positively loading the set of confronting seals 620 near the main flow of air by the blades 568. Stacking the set of confronting seals 620 while providing a gap 634 helps to protect against seal failure. The seal arrangement as described herein ensures a positive pressure load across the entire axial length of the seal, therefore protecting against seal vibration and further protecting against seal failure.

It should be appreciated that while the benefits described herein are described using numerals associated with the sixth exemplary shroud segment 606, the benefits can be applied in whole or in part to all of the exemplary shroud assemblies described herein. The benefits are therefore not limited to any one arrangement of the shroud segments as described herein.

It should be appreciated that application of the disclosed design is not limited to turbine engines with fan and booster sections, but is applicable to turbojets and turbo engines as well. It should be further appreciated that the disclosed design can be applied to, but not limited to, a nozzle inner and outer band or to a blade platform as well, and is not limited to the shroud assembly as discussed herein.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A shroud assembly for a turbine engine comprising:
   a plurality of circumferentially arranged shroud segments having confronting end faces defining first and second radially spaced surfaces, with a forward edge spanning to an aft edge to define an axial direction;
   a first seal channel provided in at least one of the confronting end faces and having a first axial portion;
   a second seal channel having a second axial portion and a second radial portion, the second seal channel provided in the at least one of the confronting end faces with the second axial portion radially spaced from the first axial portion of the first seal channel such that the first seal channel is radially closer to the first surface and the second seal channel is radially closer to the second surface; and
   a gap formed in the first seal channel between the first axial portion and the second radial portion located at a transition between the second axial portion and the second radial portion to provide for passing of fluid through the gap toward the second seal channel.

2. The shroud assembly of claim 1 wherein the gap is located at a trailing edge of the first seal channel.

3. The shroud assembly of claim 1 wherein the first seal channel terminates at a trailing end upstream of the transition to define the gap between the trailing end and the transition.

4. The shroud assembly of claim 3 wherein a first radial portion of the first seal channel is upstream of the second radial portion of the second seal channel.

5. The shroud assembly of claim 4 wherein a first distance is measured between the transition between the axial and radial portions for the first channel and the transition between the axial and radial portions for the second channel and a gap distance is measured between the trailing end of the first seal channel and the transition of the second seal channel and the gap distance is less than the first distance.

6. The shroud assembly of claim 5 wherein the gap distance is equal to the first distance.

7. The shroud assembly of claim 5 wherein the gap distance is at least 0.01 in (0.03 cm).

8. An engine component for a turbine engine comprising:
   a plurality of circumferentially arranged peripheral walls defining a mainstream flow path and having confronting end faces defining first and second radially spaced surfaces, with a forward edge spanning to an aft edge to define an axial direction;
   a first seal channel provided in at least one of the confronting end faces and having a first axial portion;
   a second seal channel having a second axial portion and a second radial portion, the second seal channel provided in the at least one of the confronting end faces with the second axial portion radially spaced from the first axial portion of the first seal channel such that the first seal channel is radially closer to the first surface and the second seal channel is radially closer to the second surface; and
   a gap formed in the first seal channel between the first axial portion and the second radial portion located at the transition between the second axial portion and the second radial portion to provide for a passing of fluid through the first seal channel to the second seal channel.

9. The engine component of claim 8 wherein the gap is located at a trailing edge of the first seal channel.

10. The engine component of claim 8 wherein the first seal channel terminates at a trailing end upstream of the transition to define the gap between the trailing end and the transition.

11. The engine component of claim 10 wherein a first radial portion of the first seal channel is upstream of the second radial portion of the second seal channel.

12. The engine component of claim 11 wherein a first distance is measured between the transition between the axial and radial portions for the first channel and the transition between the axial and radial portions for the second channel and a gap distance is measured between the trailing end of the first seal channel and the transition of the second seal channel and the gap distance is less than the first distance.

13. The engine component of claim 12 wherein the gap distance is equal to the first distance.

14. The engine component of claim 12 wherein the gap distance is at least 0.01 in (0.03 cm).

15. A method of cooling a shroud segment having confronting end faces and a first set of seal channels having a first axial portion and second set of seal channels having a second axial portion and a second radial portion, each set of seal channels provided in each of the confronting end faces where a gap is formed in the first seal channel between the first axial portion and the second radial portion at a transition between the second axial portion and the second radial portion; the method comprising passing fluid through the first seal channel to the second seal channel.

16. The method of claim 15 wherein passing fluid further comprises balancing a pressure load between an area of relatively high pressure and an area of relatively low pressure.

17. The method of claim 15 wherein passing fluid further comprises supplying cooling air through the gap to an opening in the second seal.

\* \* \* \* \*